E. D. FINCH.
AUTOMOBILE STOP.
APPLICATION FILED MAR. 28, 1918.
1,334,147.  Patented Mar. 16, 1920.
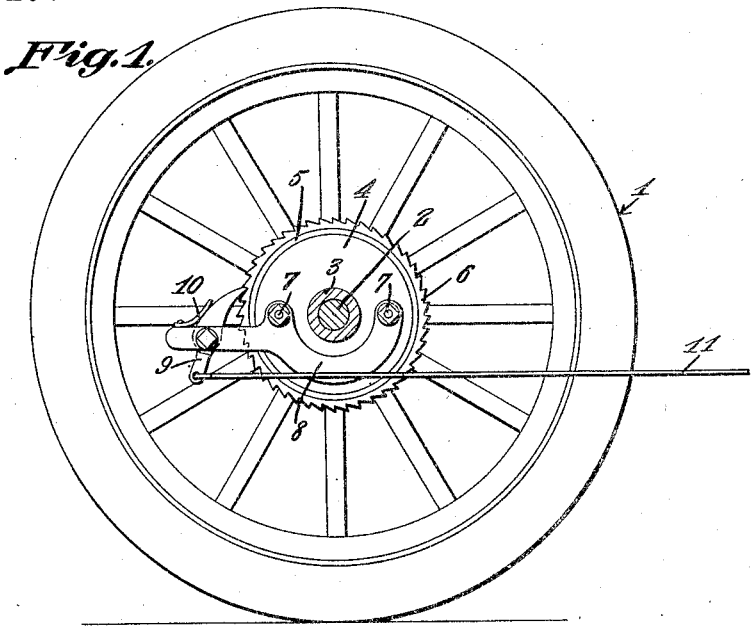
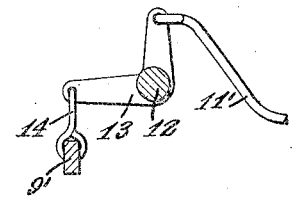
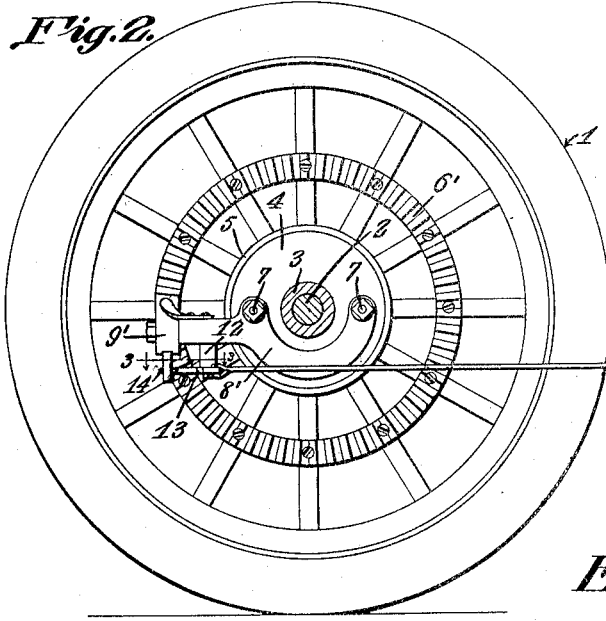
E. D. Finch, Inventor

UNITED STATES PATENT OFFICE.

EMORY DWIGHT FINCH, OF ATLANTA, NEW YORK.

AUTOMOBILE-STOP.

1,334,147.  Specification of Letters Patent.  Patented Mar. 16, 1920.

Application filed March 28, 1918. Serial No. 225,268.

*To all whom it may concern:*

Be it known that I, EMORY DWIGHT FINCH, a citizen of the United States, residing at Atlanta, in the county of Steuben and State of New York, have invented a new and useful Automobile-Stop, of which the following is a specification.

The subject of the present invention is a stop intended for use on automobiles, though applicable to any wheel supported structure.

A main object of the invention is the provision of means to prevent a vehicle from backing when stopped on an incline.

The invention also contemplates the provision of means for locking a wheel against reverse rotation, and means for releasing the locking means.

It is also within the contemplation of the invention to generally improve the construction and enhance the utility of stops of this character.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Practical embodiments of the invention are shown in the accompanying drawing, wherein:—

Figure 1 is a view in side elevation of a stop constructed in accordance with the invention, the same shown applied to a wheel the axle of which is in section;

Fig. 2 is a similar view of a modified form;

Fig. 3 is an enlarged detail taken on the line 3—3 of Fig. 2.

Referring to the drawing by numerals of reference:—

The usual drive wheel of an automobile is indicated generally by the numeral 1, and this wheel is rigid on the axle 2, which axle rotates in the housing 3. The housing 3 has the usual end flange 4 encircled by the brake drum 5, which drum is secured to the wheel 1.

A ratchet wheel 6 is provided on the brake drum 5, being secured thereto by shrinking or otherwise, or cast therewith, or otherwise formed thereon. A bracket arm 8 is secured on the flange 4 by the bolts 7, and a pawl 9 is pivoted to the bracket arm 8 and adapted to engage the teeth of the ratchet wheel 6, being held in contact with the ratchet wheel by a spring 10. A rod 11 has one end pivotally secured to the pawl 9 and extends to a suitable point near the operator's seat so that the rod may be drawn to release the pawl from the ratchet when it is desired to back the machine.

In the modification shown in Figs. 2 and 3, the ratchet wheel 6 is replaced by an annular rack 6′ which is secured to the spokes of the wheel or to the drum attached to the wheel by screws or otherwise, and which has radially disposed corrugations or teeth formed on the face thereof.

The end of the bracket arm 8′ is reduced to pivotally receive the pawl 9′. An arm 12 depends from the bracket 8′ and to this arm is pivotally attached a bell crank lever 13, one arm of which has engagement with the rear end of the operating rod 11′ and the other arm of which is attached, through a link 14 or otherwise, to the pawl 9′.

It is thought that, from the foregoing description, the operation of either form of the device will be apparent without a special and extended description thereof.

Having thus described the invention, what is claimed as new and sought by Letters Patent, is:—

1. In combination with a vehicle wheel and a disk-like flange adjacent thereto, a ratchet wheel carried by the vehicle wheel, a bracket member fixed to the flange and extending rearwardly terminating in a bearing, a pawl stationed on the bearing and adapted to coöperate with the ratchet wheel, said pawl operating in a plane at right angles to the horizontal plane of the bracket, means for normally holding the pawl in engagement with the ratchet wheel, and means for moving the pawl out of engagement with the ratchet wheel.

2. In combination with a vehicle wheel having a flange supported thereon adjacent the hub, a ratchet wheel removably secured to the wheel, a bracket member fixed to the flange, an arm depending from the bracket, a bell crank lever pivoted to the lower end of the arm, a pawl supported by the bracket, means for holding the pawl in engagement with the ratchet wheel, said pawl having an extension, means for providing connection between the extension and bell crank lever, and means for operating the bell crank lever for moving the pawl.

In testimony that I claim the foregoing as my own, I have hereto affixed my signature in the presence of two witnesses.

EMORY DWIGHT FINCH.

Witnesses:
HUMPHREY COURTNEY,
ELLIOTT S. DAVIS.